(12) United States Patent
Buchholz et al.

(10) Patent No.: US 8,757,620 B2
(45) Date of Patent: Jun. 24, 2014

(54) TEACHING AIDS USING A MATHEMATICAL MATRIX

(76) Inventors: Todd Glenn Buchholz, Solana Beach, CA (US); Victoria Jacqueline Buchholz, Solana Beach, CA (US); Katherine Sabrina Buchholz, Solana Beach, CA (US); Alexia Grace Buchholz, Solana Beach, CA (US)

( * ) Notice: Subject to any disclaimer, the term of this patent is extended or adjusted under 35 U.S.C. 154(b) by 495 days.

(21) Appl. No.: 13/074,421

(22) Filed: Mar. 29, 2011

(65) Prior Publication Data

US 2011/0233864 A1 Sep. 29, 2011

Related U.S. Application Data

(60) Provisional application No. 61/318,514, filed on Mar. 29, 2010.

(51) Int. Cl.
*A63F 3/00* (2006.01)
*G09B 19/02* (2006.01)
*A63F 3/04* (2006.01)

(52) U.S. Cl.
CPC .............. *A63F 3/0457* (2013.01); *G09B 19/02* (2013.01); *A63F 2003/0447* (2013.01); *A63F 2003/046* (2013.01); *A63F 2003/00018* (2013.01); *A63F 3/00088* (2013.01)
USPC ............................ 273/242; 273/430; 434/188

(58) Field of Classification Search
USPC ................. 273/242, 243, 253, 254, 255, 236, 273/429–432; 434/188
See application file for complete search history.

(56) References Cited

U.S. PATENT DOCUMENTS

| | | | | |
|---|---|---|---|---|
| D135,880 S * | 6/1943 | Schwer | ...................... | D21/367 |
| 3,833,221 A * | 9/1974 | Van Tol | ......................... | 273/243 |
| 4,346,897 A * | 8/1982 | Sisak | ............................. | 273/271 |
| 4,913,443 A * | 4/1990 | Currey, Jr. | ..................... | 273/244 |
| 6,065,749 A * | 5/2000 | Debie | ............................. | 273/243 |
| 6,623,008 B1 * | 9/2003 | Reed et al. | .................... | 273/242 |
| 7,341,253 B2 * | 3/2008 | Lingenfelser | ................ | 273/272 |
| 7,350,782 B2 * | 4/2008 | Sumner et al. | ............... | 273/243 |
| 7,815,191 B2 * | 10/2010 | Fanning | ....................... | 273/236 |
| 8,308,164 B2 * | 11/2012 | Castillo | ........................ | 273/243 |
| 2003/0090061 A1 * | 5/2003 | Drouhard | ..................... | 273/243 |
| 2008/0197568 A1 * | 8/2008 | Cutrofello | ..................... | 273/242 |
| 2009/0278312 A1 * | 11/2009 | Bower | ......................... | 273/243 |
| 2010/0013154 A1 * | 1/2010 | Wulf et al. | .................... | 273/243 |

\* cited by examiner

*Primary Examiner* — William Pierce
(74) *Attorney, Agent, or Firm* — Millen, White, Zelano & Branigan, P.C.

(57) ABSTRACT

Teaching aid math games utilizing a mathematical matrix organized about x and y axises where the game is played by correctly associating numbers with their corresponding stations. The matrix comprises a first string of stations and a second string of stations where the first and second strings have the same number of stations. Each station is associated with a numerical value, and each station on the first string is parallel to a corresponding station on the second string where each corresponding station pair add up to the same numerical value. The display of the matrix provides visual associations for mathematical relationships.

14 Claims, 5 Drawing Sheets

US 8,757,620 B2

TEACHING AIDS USING A MATHEMATICAL MATRIX

This application claims the benefit of the filing date of U.S. Provisional Application Ser. No. 61/318,514 filed Mar. 29, 2010, which is incorporated by reference herein.

FIELD OF THE INVENTION

The present invention is directed to a gaming device, more particularly, teaching aid math games using matrices wherein players are presented with conceptual relationships between numbers to facilitate an understanding of basic numerical concepts.

BACKGROUND OF THE INVENTION

After children have learned to count to 100, perhaps between the ages of 5 to 7 years, they can begin to appreciate how numbers from 0 to 100 combine with one another to equal 100, as well as the elementary concepts of counting by 1's, 5's and 10's to reach 100. This is also an opportunity to familiarize children with odd and even numbers, as well as the concepts of addition and subtraction. Presently, there is a need to introduce children to numbers in ways that facilitate visualization of numbers and in ways that generate excitement as they learn about numbers at various levels of understanding and skill. At a more advanced level there is a need to introduce children to working with fractions, multiplication, division, and algebra.

DEFINITIONS

For the purposes of this invention, a computer or computer unit is any electronic device with sufficient memory and processing ability to operate the game, for example a desktop computer, a laptop computer, a mobile electronic communication device, a tablet computing device, and a handheld or traditional video gaming system.

For the purposes of this invention, an incorrect association is defined as an incorrect association of a number and station or failing to correctly associate a number with its corresponding station in a given time period For the purpose of this invention, a station is a defined location on the matrix wherein numbers are associated. Stations may optionally display clues as to the numbers that are associated with them. These clues are, for example, mathematical questions for example a mathematical equation, word problem, function, or formula wherein the answer to the mathematical question is the number associated with the station.

For the purpose of this invention, a special movement space, a bonus space, or a bonus movement space refers to spaces where a user has an opportunity to move across to the opposing string or up or down the same string in a special way. Bonus movement may refer to this type of movement or also optionally to an extra turn or turns of regular movement, optionally after correctly answering a math problem.

SUMMARY OF THE INVENTION

The overall structure of the game display aids a user in visualizing mathematical relationships between numbers.

The various embodiments of the invention are teaching aid math games using matrices organized about x and y axises, the invention comprises a first string of stations and a second string of stations where the first and second strings have the same number of stations, each station is associated with a numerical value, and each station on the first string is parallel to a corresponding station on the second string wherein each corresponding station pair adds up to the same numerical value.

In some embodiments of the invention the strings are oriented along the y-axis where the top and bottom terminal station pairs are on opposite ends of the y-axis at the terminal ends of the strings. Strings are composed of numerical values from alpha to beta wherein the first string begins with alpha and the second string ends with beta and alpha and beta are rational numbers from $-\infty$ to $\infty$ and wherein the numerical values on adjacent opposite strings add up to beta.

In some embodiments of the invention the strings are oriented along the y-axis where the top and bottom terminal station pairs are on opposite ends of the x-axis at terminal ends of the string. Strings are composed of numerical values from alpha to beta wherein the first string begins with alpha and the second string ends with beta and alpha and beta are rational numbers from $-\infty$ to $\infty$ and wherein the numerical values on adjacent opposite strings add up to beta.

In view of the aforementioned considerations, some embodiments of the invention comprise a game utilizing a mathematical matrix organized about x and y axis, which comprises top and bottom stations adjacent and opposite ends of the y-axis, the top terminal stations being coincident with the numbers 50 and 50 and the bottom terminal stations being coincident with the numbers 0 and 100. Ascending numbers from 0 to 50 are arranged in a first string on a first side of the y-axis and descending numbers from 100 to 50 arranged in a second string on a second side of the y-axis. The ascending and descending strings of numbers each have stations on parallel lines which are parallel to the x-axis, wherein numbers in stations on the same line when added to one another equal 100. Numerical values may also range from for example, 0-1,000, 100-1,000, or 1,000-100,000.

In some embodiments of the invention all even numbers are associated with a first geometric shape for a station and all odd numbers are associated with a second geometric shape for a station. For example, in some embodiments the even numbers may optionally be in circles and the odd number may optionally be in a triangle. In some embodiments of the invention all even numbers are displayed in at least a first geometric shape or color and all odd numbers are displayed in at least a second geometric shape or color. In some embodiments both a geometric shape and color are used to distinguish stations.

In some embodiments of the invention the number strings are divided into line segments wherein numbers ending in the digit (N), wherein (N) is 1, 2, 3, 4, 5, 6, 7, 8, 9, or 0 and numbers ending in the digit (M), wherein (M) is 1, 2, 3, 4, 5, 6, 7, 8, 9, or 0. (N) and (M) are the terminal ends of each line segment and wherein each number ending in (N) is inline along the y-axis with the other numbers ending in (N) and each number ending in (M) is inline along the y-axis with the other numbers ending in (M), for example in some embodiments (N) is equal to 5 and (M) is equal to 0. For example in embodiments utilizing the inline y-axis 0 and 5 orientation the strings of numbers are broken into 5 number long line segments wherein each line segment is terminated by a number ending in 0 on the left and a number ending in 5 on the right or vice-a-versa. Line segments may optionally be curved.

In some embodiments of the invention the numbers are separate from the stations on the matrix and may be selectively associated with the stations.

In some embodiments of the invention one or more but not all of the stations on the matrix are pre-associated with numbers.

In some embodiments of the invention the matrix is displayed on or by a computer.

In some embodiments of the invention a numerical score is calculated and displayed at the conclusion of each game according to performance.

In some embodiments of the invention the scores are associated with the user who produced them and recorded in a memory storage unit accessible to select users In some embodiments of the invention the computer is part of a network comprising multiple computer units.

In some embodiments of the invention multiple users compete on the same matrix at the same time for the highest score.

In some embodiments of the invention the correct association of numbers and their corresponding stations is determined by the past performance of the user with regard to correctly associating numbers with their corresponding stations.

In some embodiments of the invention the relevant past performance is limited to a single game or a single round of a game.

In some embodiments of the invention past correct association of numbers with corresponding station results in more difficult future association of numbers with correct corresponding stations. For example, if a user correctly associates 4 numbers in a row with their correct stations, the game will adjust to make the next number/station match more difficult, and if the user correctly matches that number/station the next number/station match will be even more difficult. The difficulty optionally increases until the user makes an incorrect association. When the user makes an incorrect association the system optionally reduces the level of difficulty, stops increasing the level of difficulty, or increases the level of difficulty by a small degree, than when a user makes a correct association. The degree to which the game may decrease the difficulty following an incorrect association may be optionally to the least difficult number/station association, the difficultly level of the previously correctly associated number/station, or any difficultly level in between.

In the embodiments of the invention where two users compete on the same game matrix scores are optionally determined as described above. In some embodiments competing users can select any number/station pair on the matrix and points are assigned according as discussed above. In some embodiments competing users are limited to only one number/station pair and compete to be the first to correctly match the pair. Penalties are optionally applied to a user who makes an association first but whose association is incorrect. A user failing to submit an answer before the competing user makes the correct association would optionally neither be rewarded nor penalized.

In some embodiments of the invention the numbers are on elements separate from the stations wherein correctly placing the elements on the stations solves a puzzle.

In some embodiments of the invention the game may be played on a computer, over a network, on a traditional game board, or on cards.

In some embodiments where scoring is assigned to a users performance points may be assigned to a user every time the user correctly assigns a number to the correct corresponding station. Points may optionally be deducted for placing a number in an incorrect station.

In some embodiments a designated action causes the user to move from one string to the other. The designated action could be landing on a particular station, getting an answer correct, drawing a special card, or any combination thereof. The user may optionally move directly across the other string or diagonally to a space higher of lower on the other string or up or down the same string. In some embodiments a visual transportation means is displayed appropriate to the kind of movement being made. For example, when moving up the same string a latter may be displayed to move the user, when moving directly across to the other string a car may be displayed to move the user, when moving diagonally up to the other string a plane may be displayed to move the user, when moving down on the same string an elevator may be displayed to move the user, or when moving diagonally down to the other string a slide may be displayed to move the user. Other visual displays of the special movement spaces or how the user is moved may be used. With regard to a computer display, the visual display means may optionally be presented in a video or cut scene. The place on the game board visually displayed on a computer where the special movement spaces are located may be fixed or randomly generated. With regard to a game board, the visual display means of the special movement spaces may optionally be fixed displays on the game board where specific spaces are designated for certain chances types of string to string movement or bonus movement on the same string.

In some embodiments the game is played by counting up one string and then down the other. In some embodiments the game is played by rolling a dice, spinning a spinner, drawing a card, or some other means to determine movement up and down strings. In the computer based embodiments the movement means are graphically displayed. In some embodiments a math question is asked before movement is allowed or after movement to determine if movement can be continued, or both. In some embodiments the math problems are displayed in popup bubbles. In some embodiments the math problems are displayed on cards or electronically displayed cards. In some embodiments math problems must be answered correctly before moving from string to string or bonus movement on the same string. In some embodiments the answer to a math problem is the station that the user is moved to upon getting the answer to the problem correct. Math problems encompass any and all forms and styles of math problems for example, word problems, identifying the next number in a sequence, an algebra problem, a calculus problem, naming a geometric shape, or a geometry problem. In some embodiments the popup bubbles display questions related to other subjects for example science, history, literature, or trivia. In some embodiments the popup bubbles display questions related to currency exchange either within the same currency, across different currencies, or both, for example the relationship between coins and dollars or converting US dollar to Euro.

In some embodiments the stations are displayed in the geometrical shape with the same number of sides as the digit (N) or (M) in the number of the station.

In some embodiments two or more users compete to finish the game the fastest. In some embodiments the users are timed or the performance is scored based on the answers given to the different problems or both. The times and performance scores are optionally saved and can be viewed by selected users, for example a teacher, parent, other members of a class, members of a online group, or other users of the system. In some embodiments two or more users compete on the same game board to fill in the stations with the correct corresponding number the fastest.

In some embodiments the distances between numbers is consistent on each string and the distances on each string are also equivalent for example 35 is the same distance from 42 as 25 is to 32 and 16 is the same distance from 17 as 82 is to 83.

In some embodiments sounds are associated with stations sharing a common mathematical relationship. In some embodiments sounds are played when user/player lands on a particular station or stations. For example a particular tone, sound, musical piece or song or a specific part of a musical piece or song is played when a user lands on an even number and a different tone, sound, musical piece or song or a specific part of a musical piece is played when the user lands on an odd number. In some embodiments the sounds are correlated with factors for example 3, 4, 5, 6, 7, 8, 9, 10, 100, 1,000, 10,000, 100,000, or 1,000,000. In some embodiments the sounds are correlated with the geometric shape of the station.

In some embodiments the numbers related to the stations are written as currency. In some embodiments the numbers are color coded for example all numbers ending in 5 are green or all even numbers are blue, or both.

A graphical display of the game board whether on a traditional game board or displayed on a computer provides the user with visual cues and/or references to the appropriate number in each station and how numbers relate to each other, for example powers of 5 or 10, odds and evens, or numbers which add up to one hundred. The matrix provides a single platform that can be used for any math related subject for example counting addition, subtraction, multiplication, division, geometry, calculus, trigonometry, and algebra.

DETAILED DESCRIPTION

Figure 1:
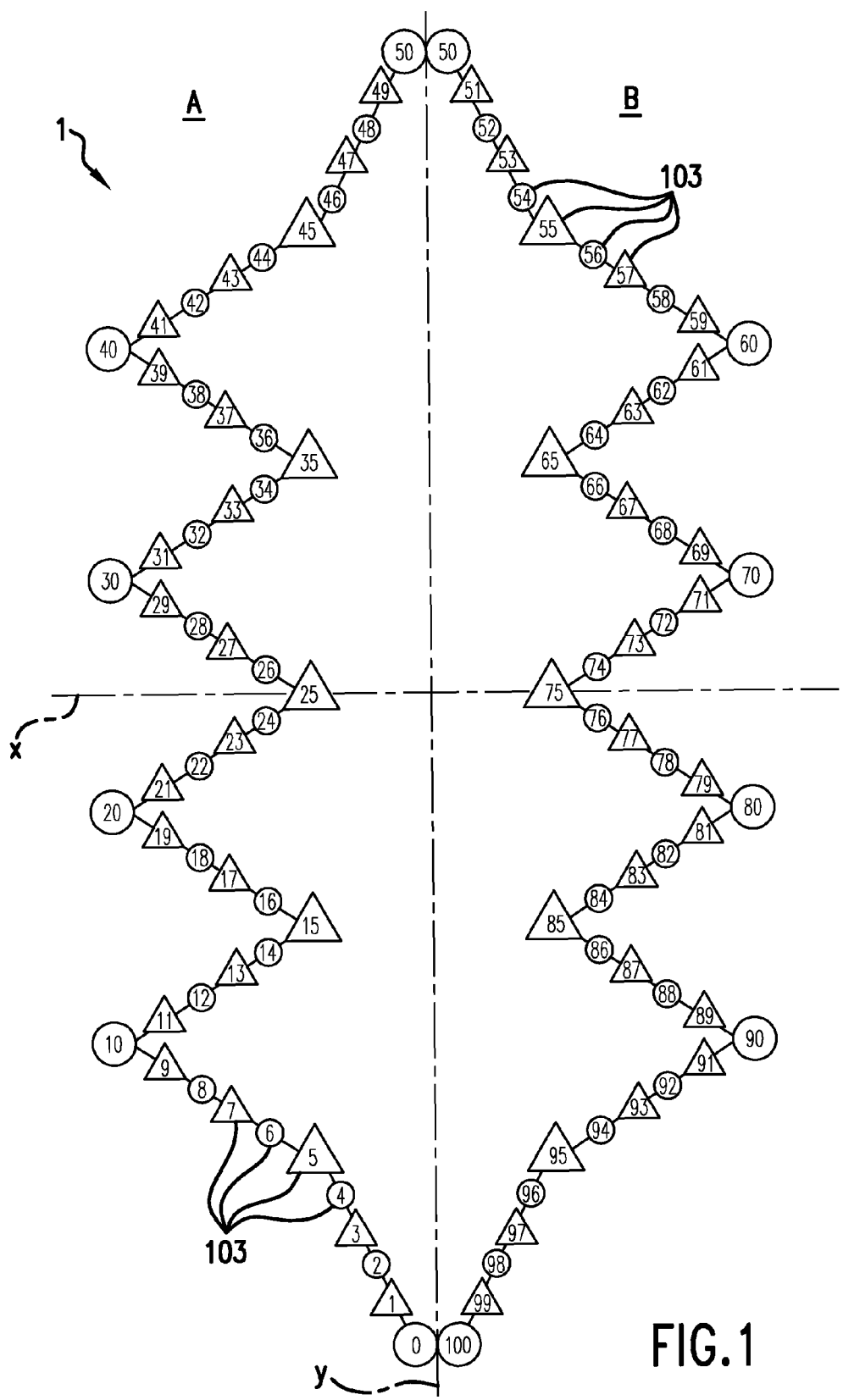
FIG. 1 is a plan view of a mathematical matrix organized in accordance with the principles of the present invention.

Referring now to FIG. 1, there is disclosed mathematical matrix (1) presenting a single integrated apparatus depicting conceptual relationships between numbers 0 to 100 which allows children to count each of the numbers individually and to count to 100 by 1's, 2's, 5's or 10's as well as to count by odd or even numbers. The mathematical matrix (1) is organized about a vertical y-axis and a horizontal x-axis with stations (103). A pair of top terminal stations having the numbers 50 and 50 and a pair of bottom terminal stations having the numbers 0 and 100. A balanced display of numbers from 0 to 100 is presented in FIG. 1. In some embodiments the 50 and 50 pair and the 0 and 100 pair may be on the left and right of the x-axis.

Considering the structure of the matrix more specifically, ascending numbers from 0 to 50 are arranged in a first string A on the left side of the y-axis and descending numbers from 100 to 50 are arranged in a second string, B on the right side of the y-axis. Numbers which are on lines parallel to the x-axis always sum to the number 100 (105), for example 47 and 53; 21 and 79, and 9 and 91. Thus, the matrix provides an apparatus to teach addition and subtraction. In order to make numbers countable by 10's more readily distinguishable, these numbers occur in straight lines parallel to the y-axis with numbers other than 50, 50 and 0, 100 being offset substantially from the y-axis. Each of the 10's numbers occurs at an apex with portions strings approaching the 10's number converging.

Each number ending in 5, so as to be wholly divisible by 5 is located at an apex in-board of the numbers evenly divisible by 10. Consequently, the matrix allows a student to readily count by 10's and by 5's while clearly showing that the 5's occur evenly between the 10's, and upon counting are always separated by 10 digits.

Figure 2:
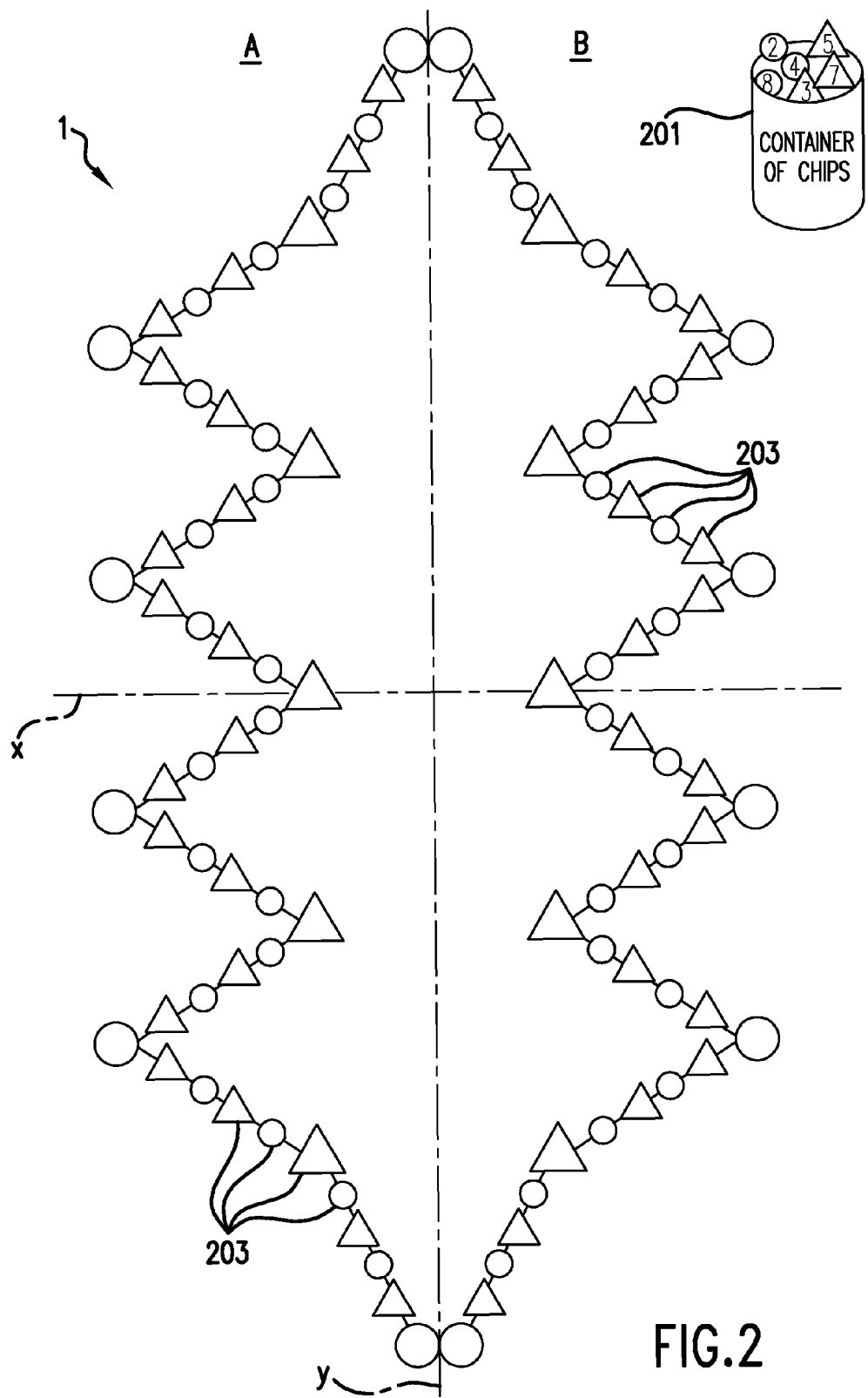
FIG. 2 is a depiction similar to FIG. 1 but with numbers removed therefrom and provided as separate elements in the form of chips which are inserted into the stations to configure the matrix of FIG. 1.

Referring now to FIG. 2, there is shown a puzzle arrangement wherein the numbers at stations (203) in the strings A and B are not present. Students are then presented with the task of entering the numbers which are provided on chips (201) in a separate pile. The chips (201) may be in a container which can be shaken. The chips (201) may pour out on a table or desk surface next to the matrix. The student's task is to properly place the chips in the matrix while initially viewing a complete or partially complete matrix displayed to the class.

In order to distinguish even numbers from odd numbers, all even numbers occur at stations (203) represented by circles and all odd numbers occur at stations (203) represented by triangles. In some embodiments all the stations (203) are the same shape and in some embodiments the shape of the station (203) is determined by the number in the digit (N) or (M) in that the station (203) has the same number of sides as the number in the digit (N) or (M) for example see FIG. 5. Optionally, the matrix may further distinguish even and odd numbers by color, for example, the even number stations (203) may be red, and the odd number stations (203) may be blue. In order to make it easier to count by 10's, the stations (203) with numbers 0, 10, 20, 30, 40, 50, 60, 70, 80, 90, and 100 may optionally be the same color. Also, the stations (203) with numbers counting by 5, but not ending in 0, may be a particular color.

Figure 3:
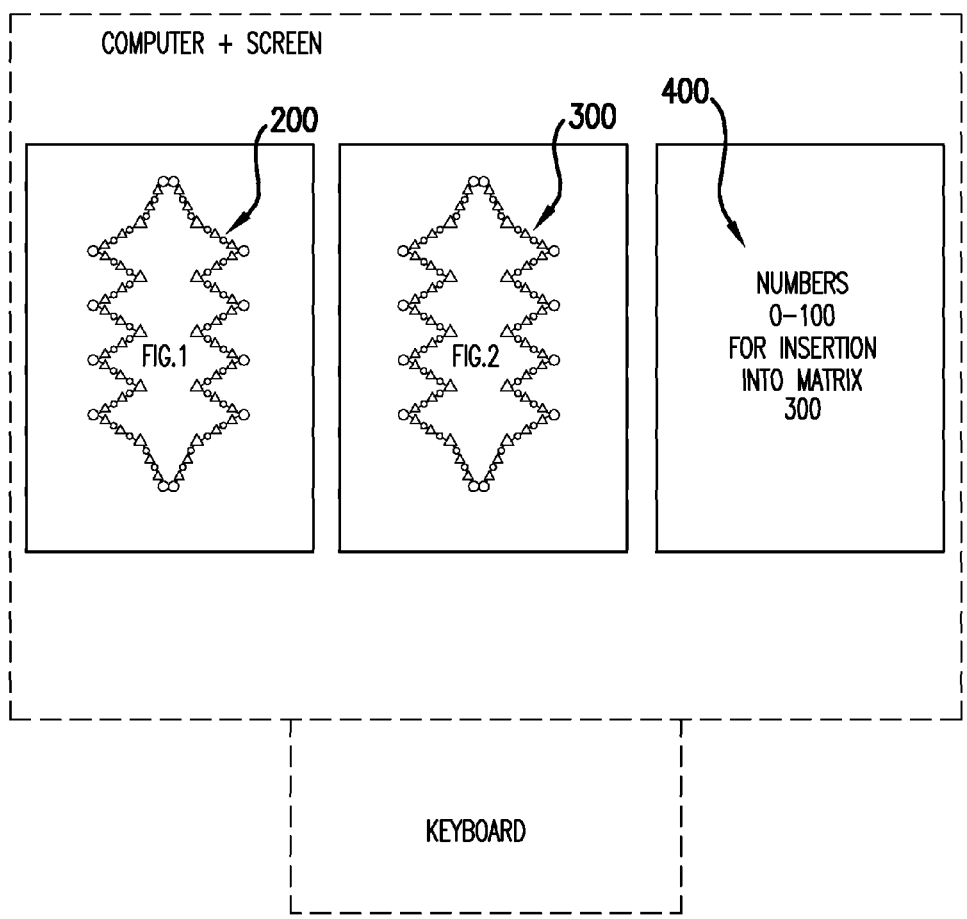
FIG. 3 is a block diagram of a computerized arrangement wherein the matrix of FIG. 1 is presented as a computerized image without numbers, which computerized image of the matrix is provided with numbers by pupils operating the computer to produce the image of FIG. 1.

In lieu of having a mechanical arrangement a computerized version of the game is shown in FIG. 3 in which an electronic image (200) of the matrix of FIG. 1 is displayed with numbers up to (100). Another image (300) of the matrix is provided with empty or partially empty stations. A separate image (400) with a bank of numbers from 0 to 100 is also provided for filling in empty stations the image (300). There are options for placing numbers from the numbers bank (400) in stations on the matrix (300) which can be done either with the image (200) present at another location or located on separate sheets at the location of each computer terminal. Children may be instructed to place all of the 10 numbers on the board and then perhaps all of the 5 numbers on the board. Finally, students can be requested to place all the numbers between the 10's and 5's on the board. Various exercises can be performed using the image of the matrix (300) with empty or partially empty stations so that the students may work with the numbers and learn what the matrix has to teach them about the relationship between the various numbers between 0 and 100. In other embodiments other ranges may be substituted for 0-100 for example 100-1000.

If necessary, an element of competition may be introduced into the instruction by timing how long it takes each student or group of students to insert a random distribution of numbers in the matrix. When a student correctly places the numbers, an audible or non-audible finish signal is provided so that those who complete the task by a selected time are rewarded. This game has many options for encouraging kids to learn about the numbers 0 to 100.

While the matrix and associated learning activities are the primary use of the matrix, other uses of the matrix have been conceived, such as but not limited to, table gaming wherein wagerers place bets on numbers they select and are rewarded according to formulas derived from the relationship of selected numbers to complements thereof which equal 100.

Figure 4:
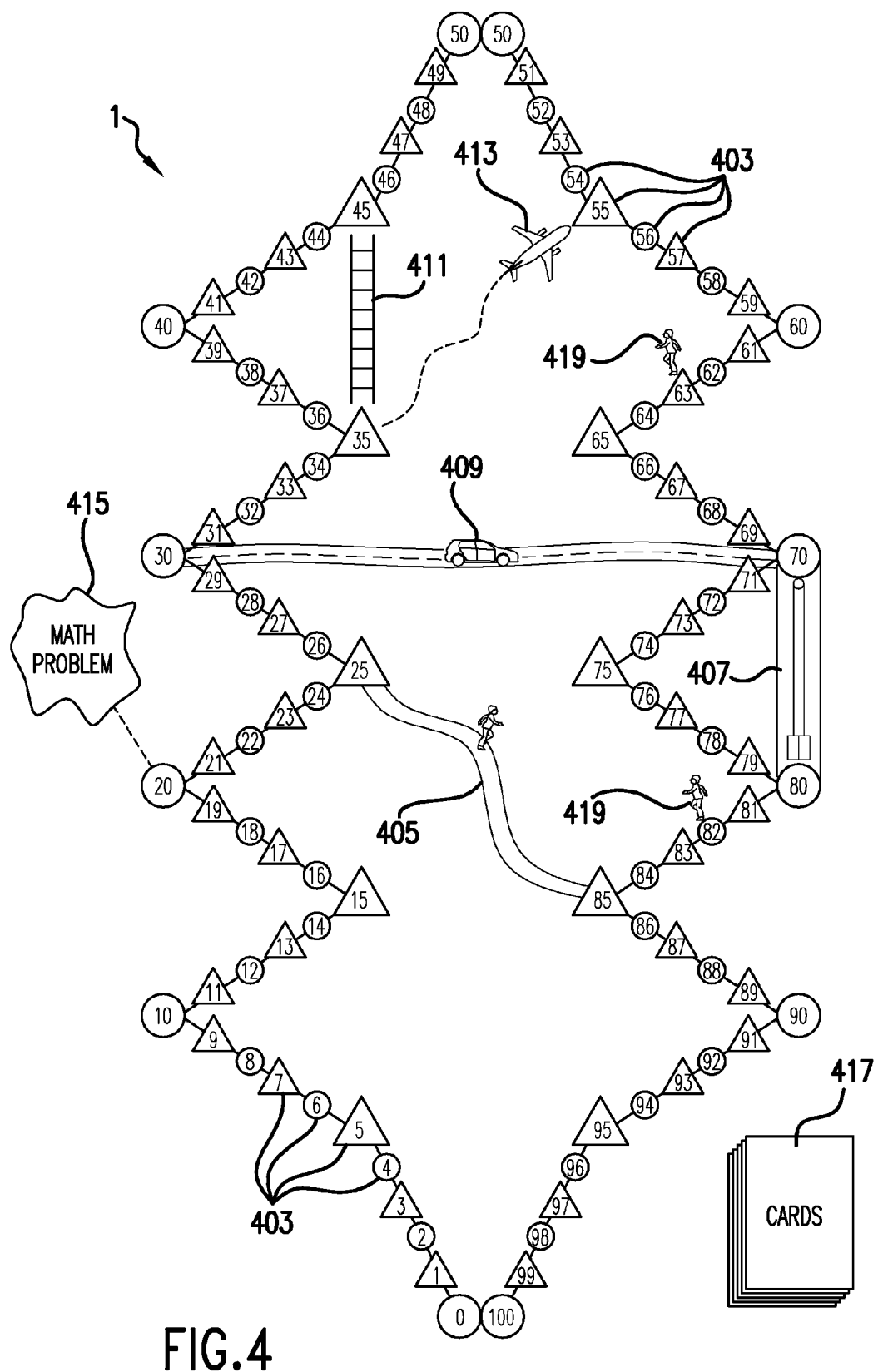
FIG. 4 is a view of the mathematical matrix showing hypothetical game play.

FIG. 4 is an illustrative example of the game in hypothetical play. The stations (403) are shown alternating between circles and triangles where circles correspond to even numbers and triangles correspond to odd numbers. Special movement spaces and examples of their effects (405, 407, 409, 411, and 413) are used by a user/player (419) when they perform an action that grants them access to the spaces for example landing on the space, answering a question, or drawing a card. When landing on a space granting downward diagonal movement a slide (405) may be used to transfer the user (419). When landing on a space granting movement directly across to the other string a car on a road (409) may be used to transfer the user (419). When landing on a space granting upward diagonal movement an airplane (413) may be used to transfer the user (419). When landing on a space granting upward movement a latter (411) may be used to transfer the user (419). When landing on a space granting downward movement an elevator (407) may be used to transfer the user (419). The Special movement spaces and examples of their effects (405, 407, 409, 411, and 413) are illustrative examples and are not meant to be limiting for example an escalator could be used to show upward or downward diagonal movement.

Math problem bubbles (415) may optionally be displayed in the computerized embodiments when user lands on a space or before a user may move from a space. The math problem bubbles (415) may be any type of math questions for example a word problem, identifying the next number in a sequence, an algebra problem, a calculus problem, naming a geometric shape, or a geometry problem. In some embodiments math problems are written on cards (417). The cards (417) may be real or displayed on a computer.

Figure 5:
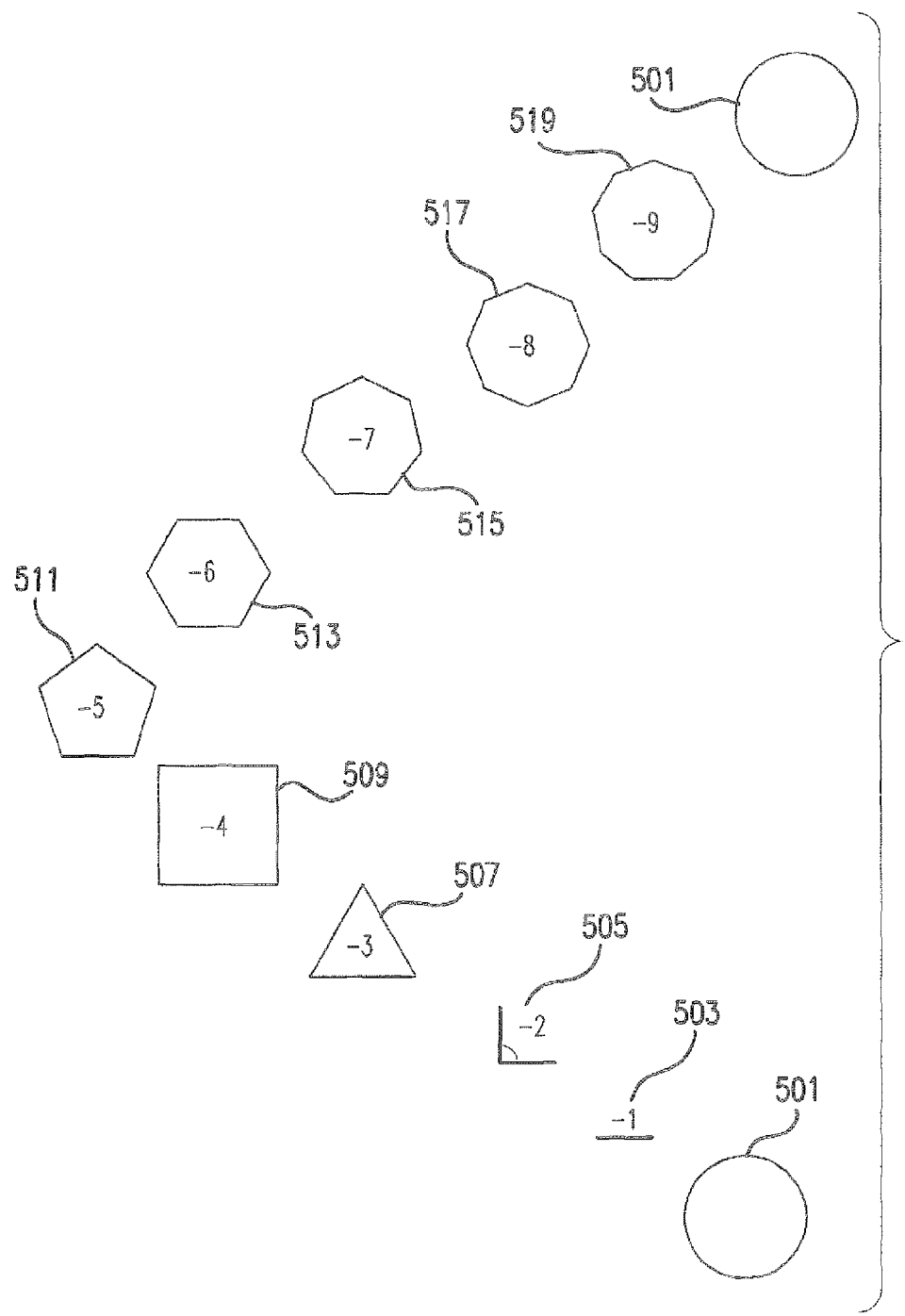
FIG. 5 is a view of a series of 10 stations beginning and ending with a number with 0 as the digit (N) or (M).

FIG. 5 shows a series of ten stations where each station is a represented by a geometric shape with the number of sides of the shape corresponding to the ones digit of the number associated with it. Numbers ending in 0 are represented by a circle (501). Numbers ending in 1 are represented by a horizontal line segment (503). Numbers ending in 2 are represented by an absolute value sign (505). Numbers ending in 3 are represented by a triangle (507). Numbers ending in 4 are represented by a square (509). Numbers ending in 5 are represented by a pentagon (511). Numbers ending in 6 are represented by a hexagon (513). Numbers ending in 7 are represented by a heptagon (515). Numbers ending in 8 are represented by an octagon (517). Numbers ending in 9 are represented by a nonagon (519). FIG. 5 is an illustrative example using regular polygons. Some embodiments may use irregular polygons or have their sides correspond to numbers other than those in the ones digit position.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding U.S. Provisional Application Ser. No. 61/318,514, filed Mar. 29, 2010, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A game comprising a mathematical matrix organized about x and y axises, said matrix comprising:
   a first string of stations and a second string of stations wherein the first and second strings are positioned parallel to each other, and wherein the first and second strings have the same number of stations,
   wherein each station is associated with a numerical value,
   wherein each station on the first string is in a plane with a corresponding station on the second string wherein each corresponding station pair add up to a numerical value beta,
   wherein the numerical value of the final station of the second string has a numerical value of beta, and
   wherein the numerical values of all stations are different from the numerical values of all other stations with the exception of the numerical values of the last station of the first string and the first station of the second string which have the same numerical value.

2. The game of claim 1, wherein all even numbers are displayed in at least a first geometric shape or color and all odd numbers are displayed in at least a second geometric shape or color.

3. The game of claim 1, wherein the numerical values are not positioned within the borders of their associated stations and wherein the numerical values may be selectively associated with the stations.

4. The game of claim 1, wherein the matrix is displayed on or by a computer.

5. The game of claim 4, wherein the computer is part of a network comprising multiple computer units.

6. The game of claim 1 wherein all adjacent stations on the first and second string share a common mathematical relationship.

7. The game of claim 6, wherein the strings are divided into segments of stations wherein the stations with numerical values ending in (N) and numerical values ending in (M) are the terminal ends of each segment and wherein each station with a numerical value ending in (N) is inline along a plane with the other stations with numerical values ending in (N) in the same string and each station with a numerical value ending in (M) is inline along a plane with the other stations with numerical values ending in (M) in the same string.

8. The game of claim 7, wherein (N) is 5 and (M) is 0.

9. The game of claim 7 wherein stations with plane of stations with a numerical value (N) and the plane of stations with a numerical value (M) are parallel to each other.

10. The game of claim 6 wherein the common mathematical relationship is an equal increase in value when moving from the beginning of the first string to the end of the second string.

11. The game of claim 10 wherein the strings are divided into segments of stations wherein each segment contains the same number of stations, wherein terminal stations of each segment are shared with an adjacent segment and wherein all segments of a string with the exception of the first and last segments of a string alternate directions and each pair of segments with a shared terminal station form a common angle which is less than 180°.

12. The game of claim 11 wherein each string comprises at least 6 segments and wherein every other terminal end align in a plane with each other and wherein the planes formed by alternating terminal ends are parallel to each other.

13. The game of claim 11 wherein each station is aligned in a plane with a station on an adjacent segment wherein the total value of the aligned stations is equal to twice the value of the shared terminal end of the segments of which the two aligned stations are a member.

14. The game of claim 1 wherein the first and second strings each consist of 50 stations,
  the numerical values of the stations in the first string are from 1-50 respectively, and the numerical values of the stations in the first string are from 50-100 respectively,
  wherein the strings are divided into segments of stations wherein the stations with numerical values ending in (5) and numerical values ending in (0) are the terminal ends of each segment and wherein each station with a numerical value ending in (5) is inline along a plane with the other stations with numerical values ending in (5) in the same string and each station with a numerical value ending in (0) is inline along a plane with the other stations with numerical values ending in (0) in the same string and wherein stations with plane of stations with a numerical value (5) and the plane of stations with a numerical value (0) are parallel to each other, and
  wherein each station is aligned in a plane with a station on an adjacent segment wherein the total value of the aligned stations is equal to twice the value of the shared terminal end of the segments of which the two aligned stations are a member.

* * * * *